US007070370B2

(12) United States Patent
Brooks

(10) Patent No.: US 7,070,370 B2
(45) Date of Patent: Jul. 4, 2006

(54) WORKPIECE BEVELING MACHINE

(76) Inventor: Louis R. Brooks, 1918 Dayton Blvd., Chattanooga, TN (US) 37405

( * ) Notice: Subject to any disclaimer, the term of this patent is extended or adjusted under 35 U.S.C. 154(b) by 197 days.

(21) Appl. No.: 10/773,489

(22) Filed: Feb. 6, 2004

(65) Prior Publication Data

US 2005/0175424 A1 Aug. 11, 2005

(51) Int. Cl.
*B23C 3/00* (2006.01)

(52) U.S. Cl. .................... 409/138; 409/134; 144/117.3

(58) Field of Classification Search ................ 409/138, 409/139, 157, 158, 159, 180, 192, 161; 144/117.3, 144/2.1, 3.1, 39, 41, 134.1, 150; 198/583; 83/412, 425.2, 432, 442, 449, 581, 440
See application file for complete search history.

(56) References Cited

U.S. PATENT DOCUMENTS 2,170,687 A 8/1939 Johnson
3,762,273 A * 10/1973 Sprung ....................... 409/138
3,916,965 A * 11/1975 Attridge et al. .......... 144/117.3
3,922,951 A * 12/1975 Linsinger .................... 409/138
3,977,298 A * 8/1976 Linsinger .................... 409/138
4,077,448 A 3/1978 Hasenwinkle et al.
4,100,949 A * 7/1978 Carter ..................... 144/117.3
4,114,665 A * 9/1978 Decker .................... 144/117.3
4,356,045 A 10/1982 Elford et al.
4,616,966 A 10/1986 Ohyama
4,852,198 A * 8/1989 Gebhardt et al. ........... 409/138
4,925,009 A * 5/1990 Hill ............................ 198/583
4,989,653 A * 2/1991 Angus ..................... 144/117.3
4,991,636 A * 2/1991 Robson ................... 144/117.3
5,058,641 A 10/1991 Giles
5,609,238 A * 3/1997 Christensen ................ 198/583
6,086,461 A 7/2000 Williams et al.
6,171,178 B1 1/2001 Park
6,732,618 B1 * 5/2004 Schreiber et al. ............. 82/149

FOREIGN PATENT DOCUMENTS

DE 101 16 381 A1 4/2001

* cited by examiner

*Primary Examiner*—Boyer D. Ashley
*Assistant Examiner*—Dana Ross
(74) *Attorney, Agent, or Firm*—Alston & Bird LLP

(57) ABSTRACT

An apparatus for beveling the edges of workpieces, such as flooring strips, as they are advanced along a path of travel on a conveyor. The apparatus has a motor assembly which mounts a cutting wheel, and the motor assembly is mounted for manual adjustment in both the in and out and up and down directions. Also, the motor assembly can float a limited distance in both of these directions. A guide shoe is mounted to the motor assembly and is positioned to ride on the workpieces. Any unevenness in the straightness, thickness, or width of the workpieces is detected by the guide shoe, which causes the motor assembly and thus the cutting wheel to closely follow the changing contour of the workpieces and impart a uniform bevel.

11 Claims, 4 Drawing Sheets

WORKPIECE BEVELING MACHINE

BACKGROUND OF THE INVENTION

The present invention relates to a beveling machine which is designed to cut a bevel of uniform dimensions along one or both edges of a workpiece, such as a floor strip with tongue and groove edges.

Such flooring strips are not always of uniform straightness, thickness, and width, and when the individual strips are formed into a finished floor, there can be raised edges which can catch the heel of a person walking on the surface. To alleviate this problem, it has been conventional to cut a small bevel along each upper edge of the flooring strips, utilizing a cutting wheel which is mounted along each side of a conveyor which serially advances the flooring strips past the cutting wheels. However, this prior practice is not entirely satisfactory since the non-uniformity of the flooring strips results in a non-uniform bevel.

It is accordingly an object of the present invention to provide a beveling machine which is adapted to cut a bevel along one or both edges of a workpiece as the workpiece is advanced along a linear path of travel, and wherein the bevel is of uniform dimensions along the edge of the workpiece.

SUMMARY OF THE INVENTION

The above and other objects and advantages of the invention are achieved by the provision of a beveling apparatus which comprises a motor assembly which includes a cutting wheel, and means mounting the motor assembly adjacent the path of travel of the workpiece as it is advanced along the path of travel by a conveyor, with the cutting wheel contacting the edge of the advancing workpiece. Also, the motor assembly is mounted to permit floating movement of the motor assembly in a direction toward and away from the edge of the workpiece as the workpiece is advanced along the path of travel.

A guide shoe is fixed to the motor assembly and positioned to ride on the advancing workpiece and so that the guide shoe and the cutting wheel follow the contour of the edge of the advancing workpiece and thereby cause a uniform bevel to be formed along the edge of the advancing workpiece.

In a preferred embodiment, the cutting wheel of the motor assembly is mounted to a rotatable draft shaft which extends in a horizontal direction which is substantially perpendicular to the path of travel of the workpiece, and the motor assembly is configured to permit separate floating movement in two directions, namely an in and out first direction which is parallel to the axis of the drive shaft and in an up and down or vertical second direction. Also, a manual adjustment of the motor assembly toward and away from the workpiece along the first direction is possible, and a separate manual adjustment of the motor assembly up and down along the second direction is also possible.

Also in a preferred embodiment, the invention comprises a second beveling apparatus which is configured to correspond to the structure and function of the above described beveling apparatus, and which is positioned on the side of the workpiece conveyor opposite the side on which the above described beveling apparatus is positioned. This permits the opposite edges of the workpieces to be concurrently beveled as they are serially advanced by the conveyor along the path of travel.

BRIEF DESCRIPTION OF THE DRAWINGS

Some of the objects and advantages of the present invention having been stated, others will appear as the description proceeds when considered in conjunction with the accompanying drawings, in which.

DETAILED DESCRIPTION OF THE PREFERRED EMBODIMENTS

Referring more particularly to the drawings, a workpiece beveling apparatus 10 is illustrated which is positioned on one side of a conveyor 12 for serially advancing the workpieces W, which in this case are flooring strips having tongue and groove edges, along a horizontal linear path of travel. The conveyor 12 is conventional and is composed of a segmented belt 13 with hold down rollers 14, note FIG. 4.

Figure 1:
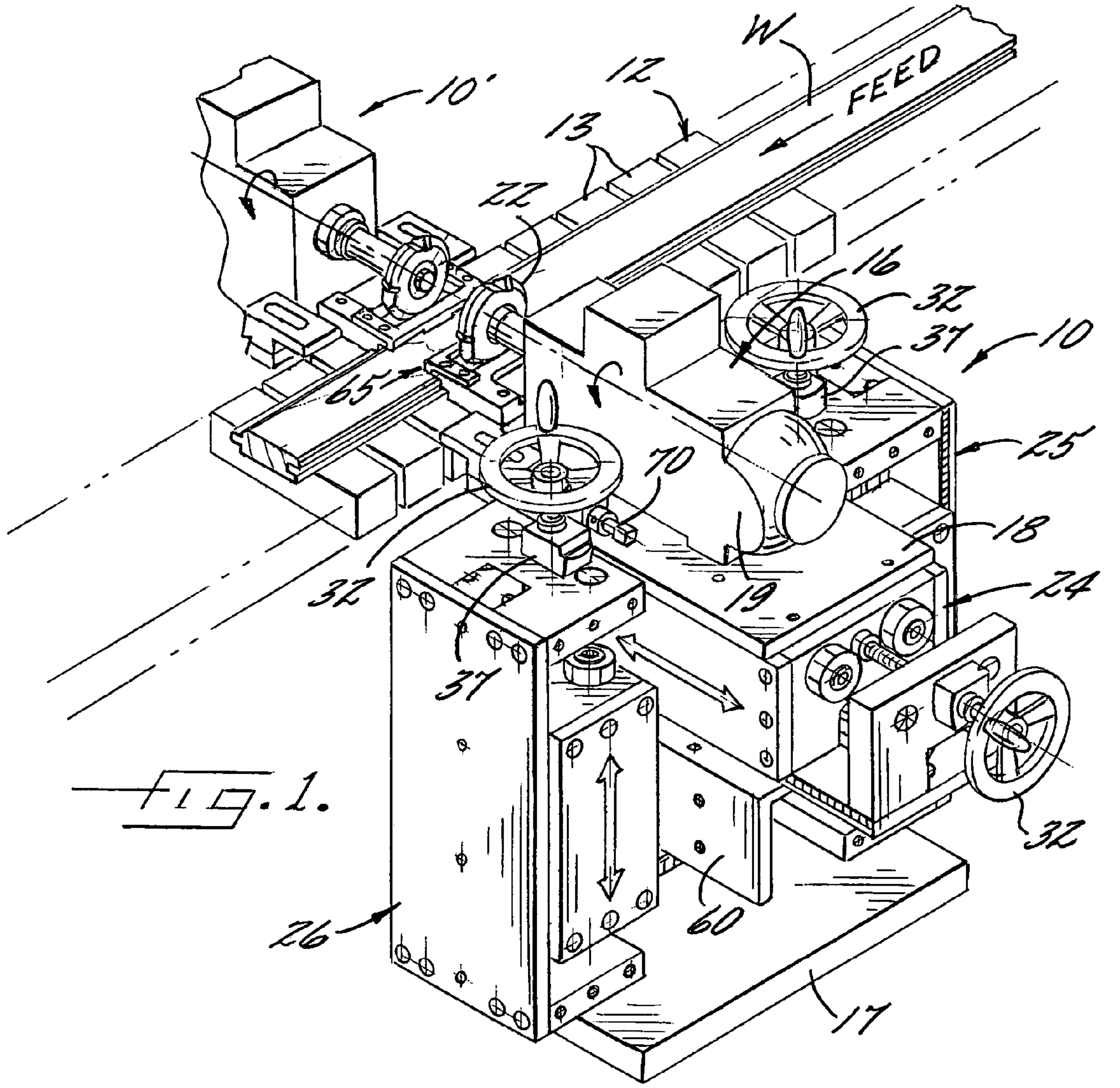
FIG. 1 is a perspective view of a workpiece beveling apparatus which embodies the present invention.
Figure 1A:
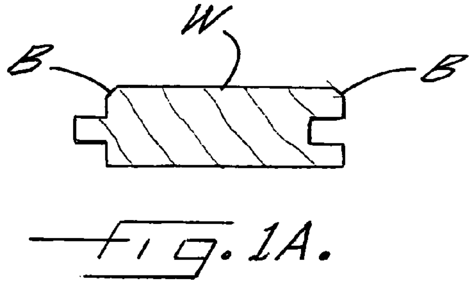
FIG. 1A is an end view of a workpiece after being processed by the apparatus of the invention.

The apparatus 10 is designed to cut a bevel B along one top edge of the advancing flooring strips as best seen in FIG. 1A, and when two apparatuses 10 and 10' are utilized as further described below, a bevel may be simultaneously cut along both top edges.

The apparatus 10 comprises a motor assembly 16 mounted on a fixed frame 17 on one side of the conveyor 12, and the motor assembly 16 includes a horizontal support plate 18 which mounts an electric motor 19. The electric motor 19 has a drive shaft 20 which extends in a generally horizontal direction which is perpendicular to the path of travel defined by the conveyor 12. A conventional cutting wheel 22 is mounted on the end of the drive shaft 20 so as to rotate in a plane which is generally vertical and parallel to the path of travel. Also, the cutting wheel 22 is mounted so as to contact the upper edge of the advancing workpieces W and cut a bevel B, as further described below.

The motor assembly 16 is mounted by a mounting arrangement which includes a first linear slide assembly 24 which permits manual adjustment of the motor assembly 16 toward and away from the path of travel along a first direction which is substantially parallel to the axis of the drive shaft 20. The first linear slide assembly 24 also permits the motor assembly 16 to float against spring biasing forces a limited distance toward and away from the workpiece along the first direction, in a manner further described below.

The mounting arrangement of the motor assembly 16 also includes second and third linear slide assemblies 25, 26 which are connected to each other in parallel, and which permit manual adjustment in an up and down or second vertical direction. The second and third linear slide assemblies 25, 26 also permit the motor assembly 16 to float against spring biasing forces a limited distance up and down along the second direction, as described in detail below.

The second and third linear slide assemblies 25, 26 are of like construction, and only the second assembly 25 will be described herein with reference to FIGS. 7–9. The second and third slide assemblies 25, 26 are disposed in a mirror image relationship on opposite sides of the motor assembly 16 and on opposite sides of the first slide assembly 24.

Figure 7:
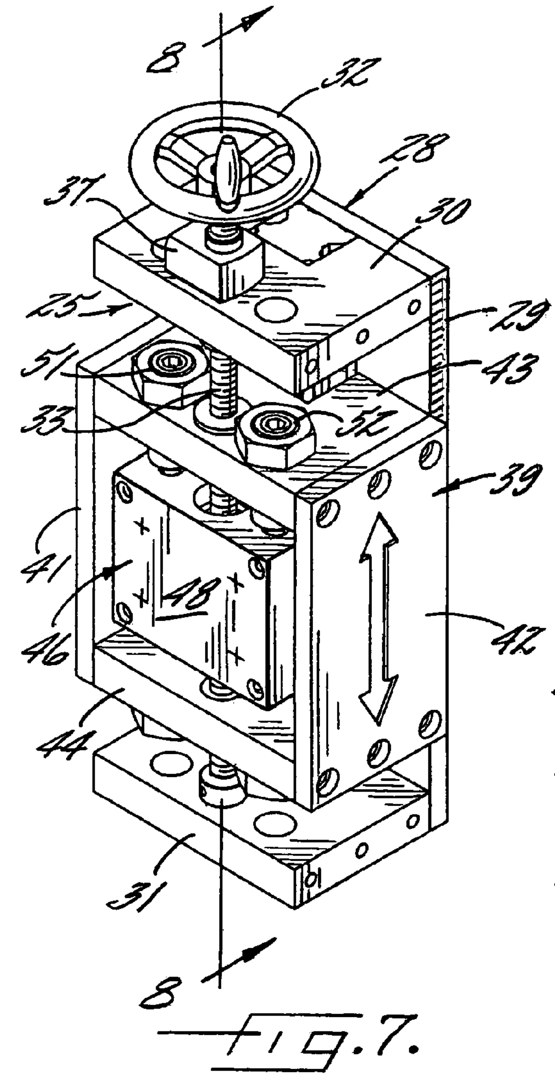
FIG. 7 is a perspective view of one of the slide assemblies of the apparatus of the invention.
Figure 8:
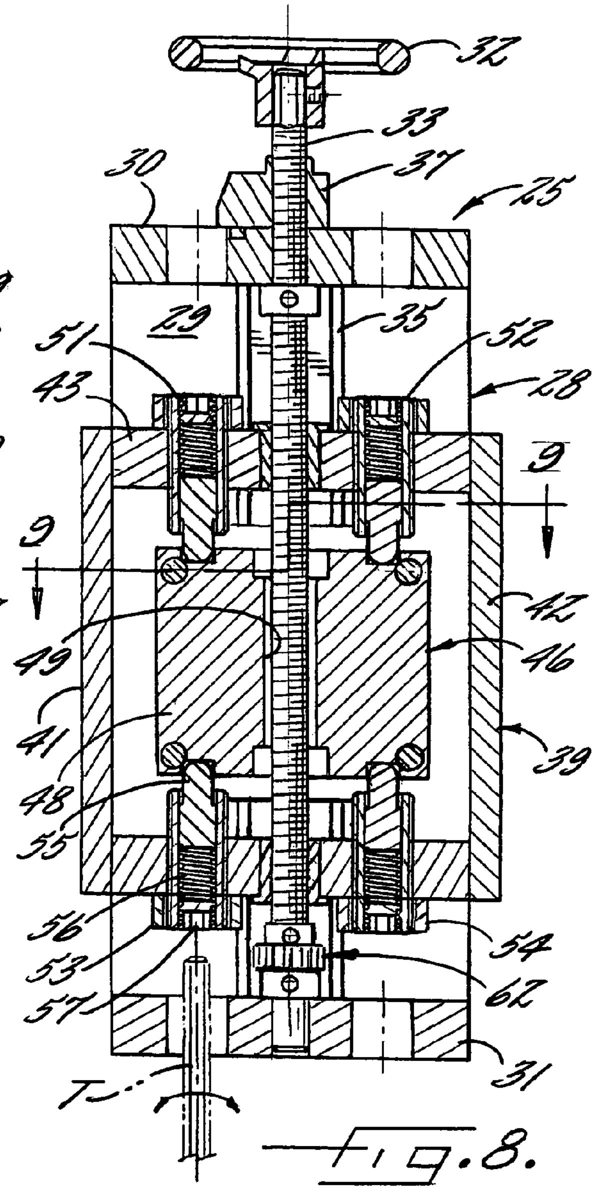
FIG. 8 is a somewhat enlarged sectional view taken along the line 8—8 of FIG. 7.
Figure 9:
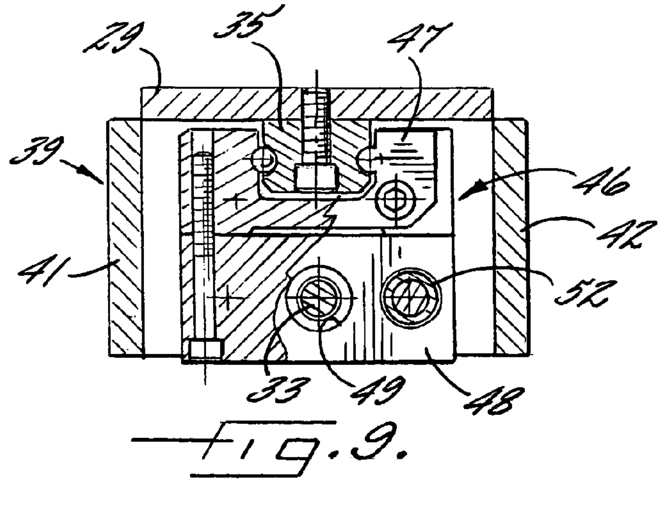
FIG. 9 is a horizontal sectional view taken along the line 9—9 of FIG. 8.

As illustrated in FIGS. 7–9, the second slide assembly 25 comprises a C-shaped frame member 28 which is fixed to the main frame 17 of the apparatus and which is composed of a vertical back plate 29 and upper and lower horizontal end plates 30, 31 respectively. An adjusting hand wheel 32 and screw 33 are provided, with the wheel being mounted to extend vertically between the end plates 30, 31 so as to permit free rotation while being held against axial movement.

The second slide assembly 25 further includes a vertically disposed guide rail 35 which is fixed between the end plates 30, 31, and a micrometer 37 is mounted to the end plate 30 for the purpose of accurately sensing the rotational position of the screw 33 and thus the hand wheel 32. The micrometer 37 thus visually indicates the height of the cutter relative to the workpiece.

The second slide assembly 25 mounts an adjustable slide housing 39 which is mounted for vertical movement along the rail 35 and the screw 33. The slide housing 39 is composed of a box-like rectangular frame which consists of two opposite side plates 41, 42 and top and bottom plates 43, 44. The screw 33 threadedly engages one or both of the top and bottom plates 43, 44, so that upon rotation of the screw the frame of the slide housing 39 moves up or down along the rail 35.

Within the slide housing 39 there is mounted a slide 46 which includes a guide plate 47 which directly engages the rail 35 via suitable bearings, so that the slide 46 is free to move up and down along the rail. The slide also has a mounting plate 48 which is fixed to the guide plate 47 as best seen in FIG. 9. As also seen in FIG. 9, the screw 33 extends freely through a vertical bore 49 in the mounting plate.

Two positioning spring assembles 51, 52 are mounted in the top plate 43 and engage the upper end of the mounting plate 48, and two positioning spring assemblies 53, 54 are mounted in the bottom plate 44 and engage the lower end of the mounting plate 48. The four spring assemblies are of like construction and each includes a plunger 55 which is axially biased outwardly by an internal spring 56. The force of the spring acting on the plunger is controlled by a cap screw 57 which may be engaged and rotated by a suitable tool T which extends through an opening in the top or bottom plate as illustrated in FIG. 8.

As will be apparent, the mounting plate 48 of each slide 46 is held between the spring assemblies 51–54 so as to permit a limited floating movement against a spring biasing force in both the up and down directions.

Figure 4:
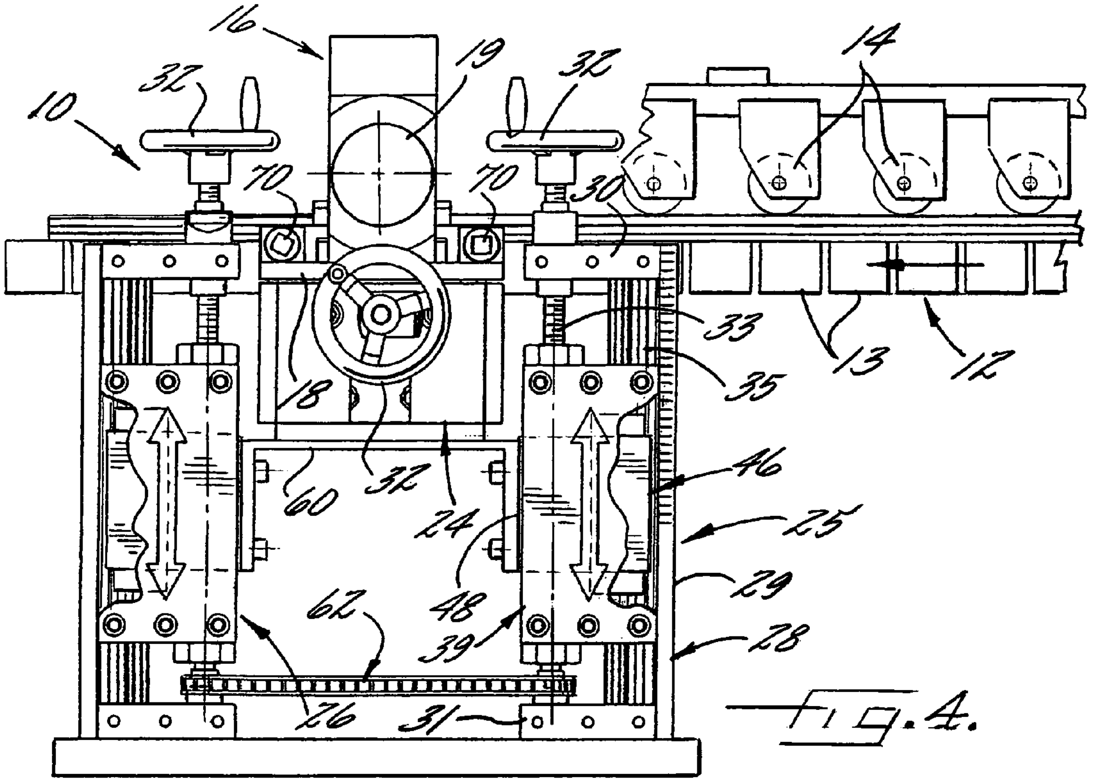
FIG. 4 is a rear elevation view of the apparatus.

The mounting plate 48 of each slide assembly 25, 26 is fixed to an inverted U-shaped bracket 60, which in turn supports the first linear slide assembly 24 thereupon, note FIG. 4. The first linear slide assembly is of a construction corresponding to the above described second and third assemblies, but it is disposed in a horizontal orientation. Also, the mounting plate 48 of the first slide assembly 24 is fixed to the support plate 18 of the motor assembly 16, so that the motor assembly 16 is mounted to permit manual adjustment and floating movement in the manner described above with respect to the second assembly 25.

In the case of the second and third linear slide assemblies 25, 26, it will be seen from FIG. 4 that the two screws 33 are rotatably interconnected by a chain and sprocket drive 62, so that the two screws always rotate in unison. As will become apparent, this permits adjustment in the up and down direction from either side of the motor assembly 16. Thus the operator may be located on either side of the motor assembly and may turn either one of the hand wheels 32 to effect the desired adjustment.

From the above, it will be seen that rotation of the hand wheel of either of the second and third slide assemblies 25, 26 causes both slide housings 39 and thus the motor assembly 16 to move up or down, and the positioning of the slide housing and motor assembly may thereby be manually adjusted in the vertical direction. The back plate 29 of the second slide assembly 25 may have a scale printed thereon to facilitate the placement of the motor assembly at a desired elevation, note FIGS. 4 and 7. Also, the slide housings 39 and motor assembly 16 can then float a limited distance in both vertical directions from the adjusted setting.

Figure 3:
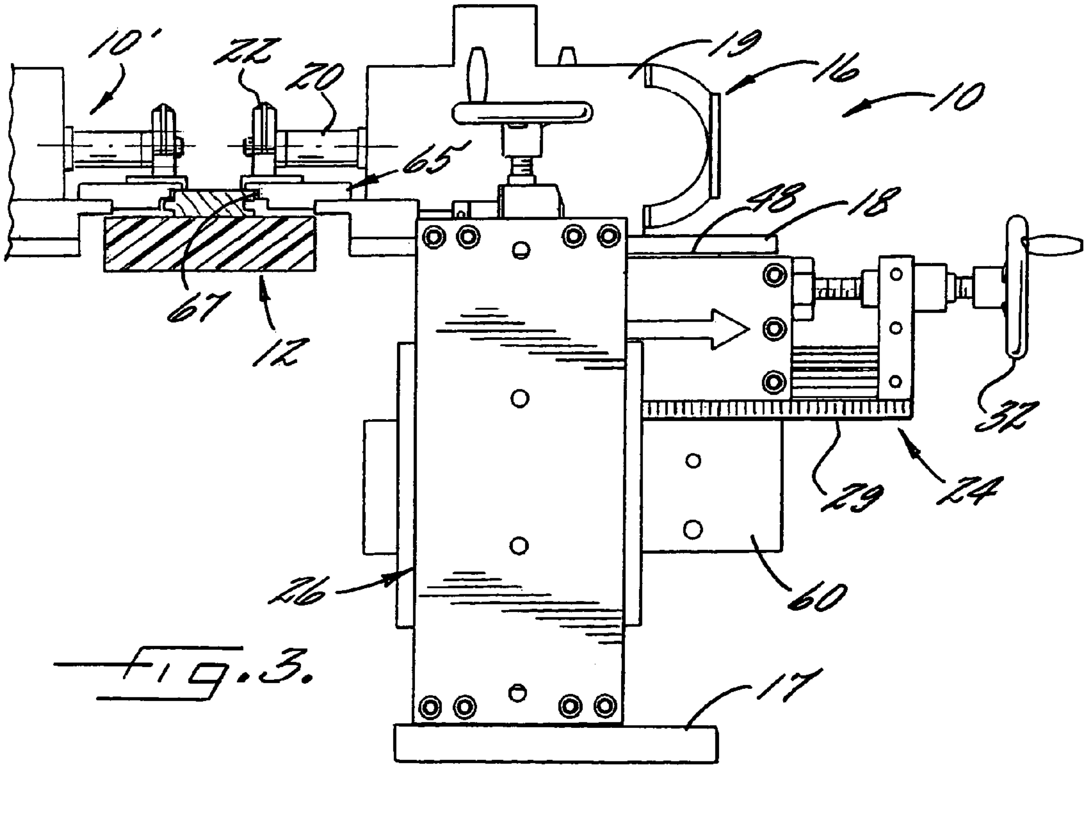
FIG. 3 is a side elevation view of the apparatus.

Similarly, rotation of the hand wheel of the first slide assembly 24 causes the slide housing 39 and the motor assembly 16 to move in and out along a direction parallel to the axis of the drive shaft 20, and a scale may be printed on the back plate to indicate its position, note FIG. 3. Once the manual adjustment is completed, the motor assembly can then float a limited distance in the in and out directions from the manual setting.

The edge of the support plate 18 of the motor assembly which is adjacent the conveyor 12 mounts a guide shoe 65 which is positioned to engage and ride on each advancing workpiece. The guide shoe 65 includes a horizontal, downwardly facing first contact surface 66 which is positioned to engage the top surface of the workpiece, and a vertical second contact surface 67 which is positioned to engage the side edge of each advancing workpiece. The second guide surface 67 is substantially aligned with and axially inside of the plane of the cutting wheel 22, and the first guide surface 66 is positioned on a bar 68 which is axially beyond the plane defined by the cutting wheel.

The guide shoe 65 is mounted to the support plate 18 of the motor assembly 16 so that the cutting wheel is located in the opening formed between the outer bar 68 and the main body of the guide shoe, and so as to permit manual adjustment of the guide shoe toward and away from the cutting wheel in a direction which is substantially parallel to the axis of the rotatable drive shaft 20. This mounting arrangement includes a pair of parallel threaded members 70 which are mounted on the support plate 18 for free rotation and which, are threadedly joined to the rear sides of the shoe 65, note FIG. 2. Thus rotation of the two threaded members 70 causes the shoe 65 to move in and out with respect to the workpieces W.

As part of the machine set-up, the operator initially adjusts the positioning of the guide shoe 65 on the support plate 18 so as to properly engage the particular workpieces W to be beveled. Next, the operator adjusts the hand wheel 32 of the first linear slide assembly 24 to set the cutting wheel 22 at the proper position in the in and out direction with respect to the size of the workpieces, and the operator also adjusts the hand wheel of the closest of the second and third linear slide assemblies 25, 26 to set the cutting wheel 22 at the proper position in the up and down direction.

The conveyor 12 and the motor 19 are then activated, so that the workpieces W are serially conveyed along a horizontal path of travel past the rotating cutting wheel 22. The second contact surface 67 of the guide shoe rides on the adjacent edge of each workpiece (note FIG. 3), and in the event of a variation in the width of the workpiece, the shoe 65 follows the contour and causes the motor assembly 16 to float so that its position relative to the changing contour is maintained.

Figure 5:
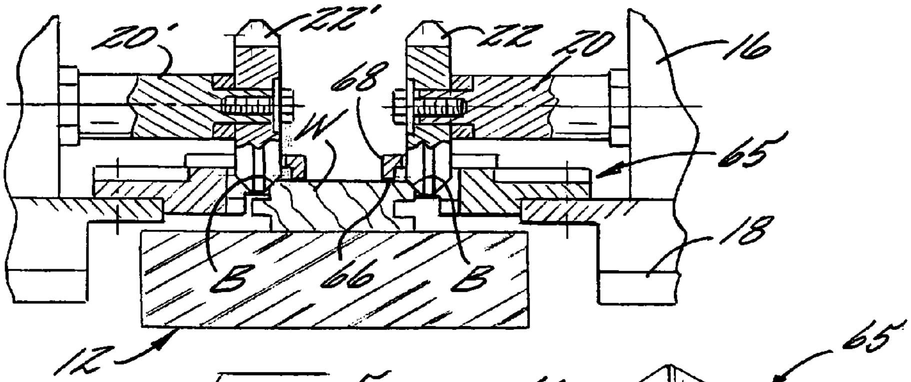
FIG. 5 is a transverse sectional view taken along the line 5—5 of FIG. 2.
Figure 6:
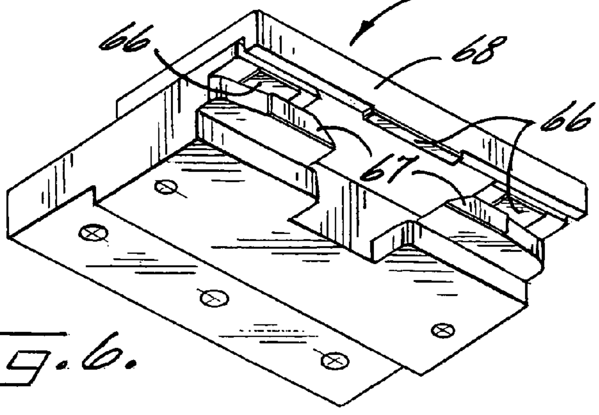
FIG. 6 is a perspective view of the underside of the hold down guide shoe as used with the apparatus of the invention.

The first contact surface 66 of the guide shoe 65 rides on the top of each workpiece (note FIG. 5), causing the motor assembly 16 to float up and down with the changing thickness of the workpiece. Thus the cutting wheel 22 closely follows the contour in both directions, resulting in a uniform dimension of the bevel B being cut.

Figure 2:
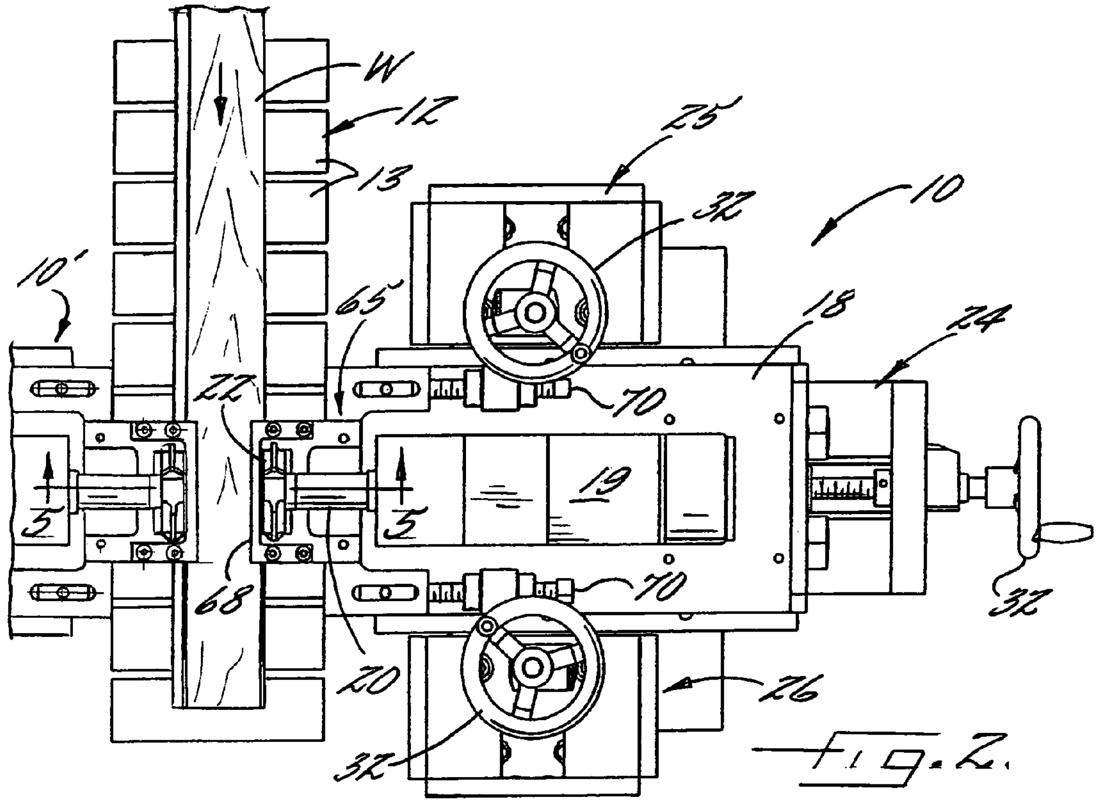
FIG. 2 is a top plan view of the apparatus.

As schematically illustrated in FIGS. 1–3, the apparatus of the invention may incorporate a second beveling apparatus 10' which is of a construction substantially identical to that described above. The use of a second beveling apparatus permits the opposite edges of the workpieces W to be concurrently beveled as they are advanced along the conveyor.

Many modifications and other embodiments of the invention set forth herein will come to mind to one skilled in the art to which this invention pertains having the benefit of the teachings presented in the foregoing description and the associated drawings. For example, the apparatus 10 as specifically illustrated herein is configured to move and float in two directions, i.e. in and out and up and down, but the apparatus could be configured to move and float in a single direction, e.g. in a direction perpendicular to the beveled surface being formed on the workpieces. Therefore, it is to be understood that the invention is not to be limited to the specific embodiment disclosed and that modifications and other embodiments are intended to be included within the scope of the appended claims. Although specific terms are employed herein, they are used in a generic and descriptive sense only and not for purposes of limitation.

That which is claimed:

1. An apparatus for beveling an edge of a workpiece as the workpiece is advanced along a linear path of travel, and comprising a motor assembly which includes a cutting wheel, means mounting the motor assembly adjacent one side of the path of travel with the cutting wheel contacting the edge of the advancing workpiece and so as to permit floating movement of the motor assembly in a predetermined direction toward and away from the edge of the workpiece as the workpiece is advanced along the path of travel, and a guide shoe fixed to the motor assembly and positioned to ride on the advancing workpiece and so that the guide shoe and the cutting wheel follow the contour of the edge of the advancing workpiece and thereby cause a uniform bevel to be formed along the edge of the advancing workpiece, wherein the linear path of travel of the advancing workpiece is horizontal, wherein said predetermined direction of the floating movement of the motor assembly is substantially perpendicular to said horizontal path of travel, and wherein the means mounting the motor assembly comprises a linear slide assembly which includes a fixed frame member and a slide housing mounted to the frame member, with the slide housing supporting a slide for limited movement against a spring biasing force both toward and away from the edge of the workpiece along said predetermined direction, and with the slide being fixedly connected to said motor assembly.

2. The apparatus of claim 1 wherein the linear slide assembly further includes an adjustment screw interconnected between the fixed frame member and the slide housing whereby rotation of the screw causes the slide housing to move toward or away from the edge of the workpiece along said predetermined direction and thereby permit the manual adjustment of the position of the cutting wheel with respect to the advancing workpiece.

3. An apparatus for beveling an edge of a workpiece as the workpiece is advanced along a linear path of travel, and comprising a motor assembly which includes a cutting wheel, means mounting the motor assembly adjacent one side of the path of travel with the cutting wheel contacting the edge of the advancing workpiece and so as to permit floating movement of the motor assembly in a horizontal first direction toward and away from the edge of the workpiece as the workpiece is advanced along the path of travel, and to permit separate floating movement of the motor assembly in a vertical second direction toward and away from the edge of the workpiece as the workpiece is advanced along the path of travel, and a guide shoe fixed to the motor assembly and positioned to ride on the advancing workpiece and so that the guide shoe and the cutting wheel follow the contour of the edge of the advancing workpiece and thereby cause a uniform bevel to be formed along the edge of the advancing workpiece, wherein the means mounting the motor assembly is configured to permit manual adjustment of the motor assembly toward and away from the workpiece along the first direction, and to permit separate manual adjustment of the motor assembly up and down along the second direction, and wherein the guide shoe includes a first contact surface which is positioned to engage the top surface of the advancing workpiece, and a second contact surface which is positioned to engage the side edge of the advancing workpiece.

4. The apparatus of claim 3 wherein the guide shoe is mounted to the motor assembly so as to permit manual adjustment of the guide shoe toward and away from the cutting wheel along the first direction.

5. The apparatus of claim 4 wherein the first contact surface is positioned axially beyond a plane defined by the cutting wheel, and the second contact surface is substantially parallel to said plane and positioned axially inside of said plane.

6. The apparatus of claim 3 wherein the motor assembly further comprises a horizontal support plate and an electric motor mounted upon said support plate and connected to rotate a drive shaft about its axis, with said drive shaft mounting said cutting wheel, and wherein said means mounting the motor assembly so as to permit floating movement in the first direction comprises a first linear slide assembly which includes a fixed frame member and a slide housing mounted to the frame member, with the slide housing supporting a slide for limited movement against a spring biasing force toward and away from the edge of the workpiece along said first direction.

7. The apparatus of claim 6 wherein said means mounting the motor assembly so as to permit separate floating movement in the vertical second direction comprises a second linear slide assembly which includes a fixed frame member and a slide housing mounted to the frame member, with the slide housing supporting a slide for limited movement against a spring biasing force toward and away from the edge of the workpiece along said second direction.

8. The apparatus of claim 7 wherein the slide housing of the first linear slide assembly is mounted to the fixed frame member by means of a threaded screw which permits the slide housing to be adjustably positioned along the first direction, and wherein the slide housing of the second linear slide assembly is mounted to the fixed frame member thereof by means of a threaded screw which permits the slide housing to be adjustably positioned along the second direction.

9. The apparatus of claim 8 wherein said means mounting the motor assembly so as to permit movement in the vertical second direction further comprises a third linear slide assembly which has a structure substantially identical to that of said second linear slide assembly, with the second and third linear slide assemblies being positioned on respective opposite sides of the motor assembly, and wherein the adjusting screws of the second and third linear slide assemblies are rotatably interconnected for concurrent rotation.

10. An apparatus for beveling an edge of each of a plurality of serially advancing workpieces, comprising a conveyor for serially advancing the workpieces along a horizontal linear path of travel, a motor assembly which includes a support plate, an electric motor mounted upon said support plate, and a drive shaft connected to the motor and extending in a generally horizontal direction which is generally perpendicular to said path of travel, and a cutting wheel mounted to said drive shaft so as to rotate in a plane which is generally parallel to said path of travel, means mounting the motor assembly adjacent one side of the conveyor with the cutting wheel contacting an edge of each advancing workpiece, said mounting means being configured to permit manual adjustment of the motor assembly toward and away from the path of travel along a first direction which is substantially parallel to the axis of the rotatable drive shaft, and to permit separate manual adjustment of the motor assembly up and down along a second direction which is substantially vertical, and said means mounting the motor assembly further comprising means permitting the motor assembly and thus the cutting wheel to float toward and away from the workpiece along the first direction and to float up and down along the second direction after being manually adjusted in both the first and second directions, and a guide shoe fixed to the motor assembly and positioned to ride on each advancing workpiece and so that the guide shoe and the cutting wheel follow the contour of the edge of each advancing workpiece and thereby cause a uniform bevel to be formed along the edge of each advancing workpiece.

11. The apparatus of claim 10 wherein the apparatus further comprises a second motor assembly which includes a support plate, an electric motor mounted upon said support plate, and a drive shaft connected to the motor and extending in a generally horizontal direction which is generally perpendicular to said path of travel, and a cutting wheel mounted to said drive shaft so as to rotate in a plane which is generally parallel to said path of travel, means mounting the second motor assembly adjacent the conveyor on the side thereof opposite the first mentioned motor assembly, with the cutting wheel of the second motor assembly contacting an edge of each advancing workpiece which is opposite to the edge contacted by the cutting wheel of the first mentioned motor assembly, said mounting means configured to permit manual adjustment of the second motor assembly toward and away from the path of travel along a first direction which is substantially parallel to the axis of the rotatable drive shaft, and to permit separate manual adjustment of the motor assembly up and down along a second direction which is substantially vertical, and said means mounting the motor assembly further comprising means permitting the motor assembly and thus the cutting wheel to float toward and away from the workpiece along the first direction, and to float up and down along the second direction after being manually adjusted in both the first and second directions, and a second guide shoe fixed to the second motor assembly and positioned to ride on each advancing workpiece and so that the second guide shoe and the cutting wheel of the second motor assembly follow the contour of the edge of each advancing workpiece and thereby cause a uniform bevel to be formed along the edge of each advancing workpiece.

* * * * *